Oct. 8, 1940.                W. SEIGLE ET AL                2,217,565
                INTERMITTENTLY FLASHING ILLUMINATED FISHING LURE
                          Filed June 20, 1938
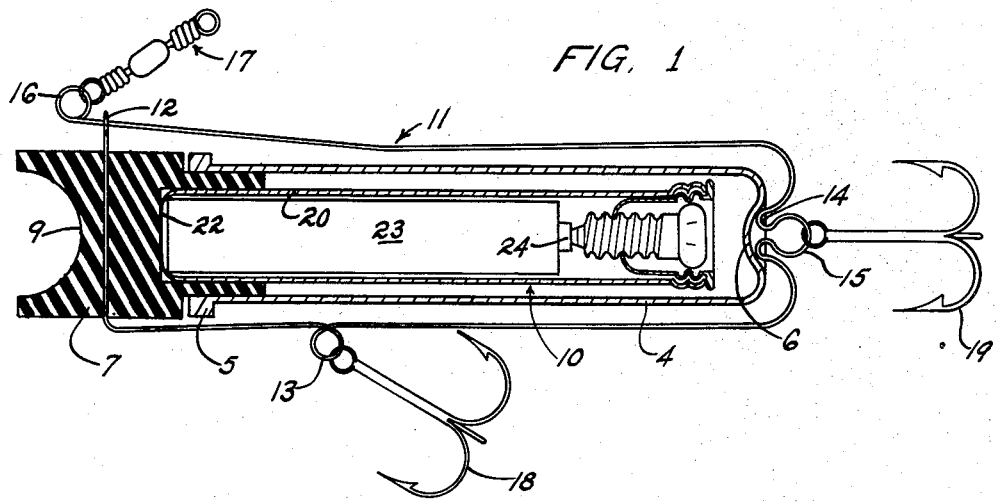
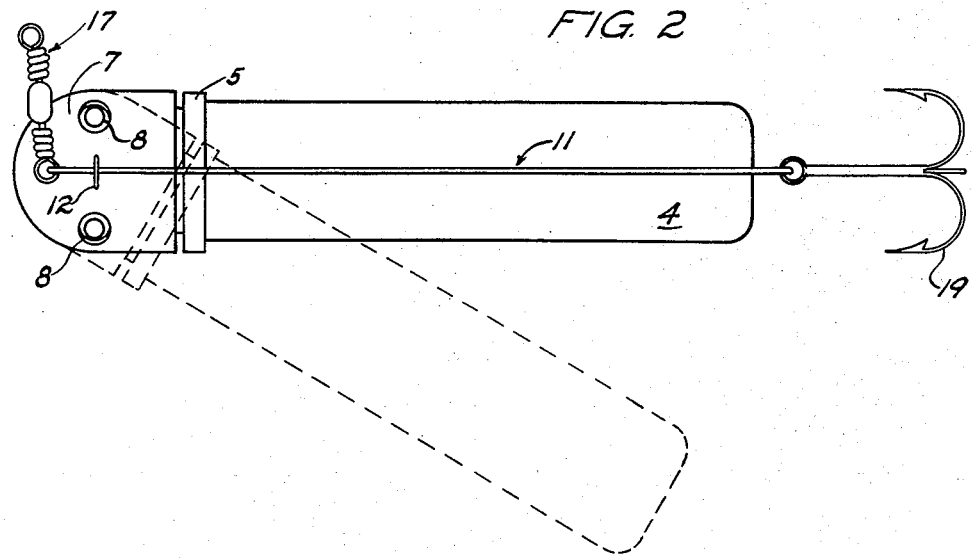
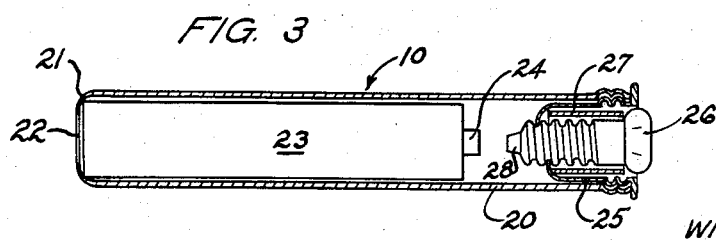
WILLIAM SEIGLE
MAURICE SEIGLE
INVENTOR
BY Loyal J. Miller
ATTORNEY Patented Oct. 8, 1940

2,217,565

UNITED STATES PATENT OFFICE 2,217,565

INTERMITTENTLY FLASHING ILLUMINATED FISHING LURE

William Seigle and Maurice Seigle, Hinton, Okla.

Application June 20, 1938, Serial No. 214,746

8 Claims. (Cl. 43—44)

This invention relates to improvements in illuminated artificial fish baits and lures of the type which may be used for either trolling, casting, or still fishing, and either as a submerged or surface lure.

The principal object of the invention is to provide a lure of this type in which the light may be adjusted to shine continuously whether on the surface of the water or submerged, or may be adjusted to flash on and off as the body of the lure assumes various positions in the water.

Another object of the invention is to provide a novel construction whereby the hooks are connected directly to a wire frame, which in turn is connected by a swivel to the fishing line, thus leaving the body or housing which contains the lighting assembly entirely free from strain, and entirely preventing the loss of a fish due to the parting of the lure body.

Another object of the invention is to provide a lure of this type, the lighting assembly of which may be adjusted so that the lure may be used without the light being lit.

Most illuminated lures are made in two parts, one of the parts carrying the hooks and the other part being attached to the fishing line. These two parts are usually connected by threads and since it is necessary that the housing be transparent or at least partially so, it is also necessary that the housing be made of comparatively light material, and the threads made in such material are seldom of sufficient strength to withhold the strain placed upon them by a hard struggle with a large fish. Our construction completely eliminates any strain whatever on the body of the lure.

Another object of the invention is to provide a lighting assembly from which the battery or the light bulb may be easily removed or replaced, and which may also be removed as a complete unit from the body of the lure.

The details in the construction of a preferred form of our invention, together with other objects attending its production, will be better understood from the following description when read in connection with the accompanying drawing, which is chosen for illustrative purposes only, and in which Figure 1 is a side elevation of the lure with the body proper being shown in section, and with the lighting assembly also shown in section;

Figure 2 is a plan view of the lure, the dotted lines showing the manner in which the body is pivoted at its forward end; and, Figure 3 is a side sectional view of the lighting assembly complete, and shows particularly the means for adjusting the assembly to accomplish the flashing of the bulb.

The body 4 of the lure may be made of any suitable material and of any desired form. We have illustrated it in a substantially cylindrical form with one open end, and with a heavy binding or ring 5 around that open end. The opposite end of the body 4 is closed and indented, as indicated by the numeral 6. A head 7 is made to resemble the head of a fish and is provided with eyes 8 made of any suitable material, the front portion of the head being preferably concave as indicated at 9, to form a means for making the entire lure move from side to side as it is drawn through the water. The opposite end of the head 7 is somewhat reduced in size to form a tight fit with the inner surface of the open end of the body 4, thus completely sealing said body against the entrance of air or water. The head 7 is preferably made of rubber or any other suitable electrically non-conductive material. Its rear end is cylindrically hollowed out, as shown, to receive one end of the lighting assembly, which is designated as a whole by the numeral 10.

A hook supporting frame 11 is pivoted at its forward end through the head 7, one end of the wire frame being bent in the form of an eyelet 12. From its pivot point at the forward end of the lure, the wire frame extends rearwardly along the underside of the body where a hook supporting loop 13 is formed intermediate the ends of the body, and from there extends rearwardly to form a suitable bifurcated tension fastener 14 which is received in the indented portion 6 of the body to hold the frame normally in alignment therewith. In addition, a second hook holding loop 15 is formed at the rear end of the frame 11, and the frame then extends along the upper surface of the lure, passes through the eyelet 12, and its extreme end is formed into a loop 16, which loop serves as a stop to prevent the free end of the frame from slipping out of the eyelet 12. A swivel attachment 17 is attached through the loop 16, and its opposite end may be attached to a fishing line.

With such an arrangement it can easily be seen that the natural tendency of the wire to retain its normal shape would tend to hold the tension fastener 14 in the indented portion 6 of the body. The fact that the part of the wire frame 11 which passes through the eyelet 12 is slidable therein permits the user to grasp the rear loop 15, pull it slightly rearwardly and spring the fastener 14 out of the indentation 6, thus releasing the entire hook supporting frame 11 to pivot about the lure body 4. The dotted lines in Figure 2 show the pivoting of the body about the upright portion of the wire supporting frame. The twisted form of the intermediate loop 13 also gives an added tension to the wire frame. In case a fish is caught on either of the hooks 18 or 19, the entire pull of the fish is on the wire frame 11, and not on any part of the lure body. Even if the pull of the fish is sufficient to release the tension fastener 14 from the indentation 6 and the entire lure body pivots about the forward end of the frame, it is still impossible for the fish to be released from the line, since all the pull is exerted on the wire frame and not on any part of the lure body.

Referring to Figures 1 and 2, we prefer to construct the lighting assembly as a complete and removable unit. This lighting assembly comprises preferably, an electrically conductive shell 20, one end of which is slightly convex in shape as indicated by the numeral 21, and which end has an opening 22 therein which is slightly smaller in diameter than the diameter of a battery 23. This particular end of the shell 20 is of such outside diameter as to fit tightly in the hollowed portion of the head 7, so that the opening 22 lies immediately adjacent a non-conductive body when said shell is properly positioned in the head. Thus, if the battery 23 is reversed in position the terminal 24 thereof is entirely prevented from any possible contact which would tend to short circuit the battery. The battery 23 is always used without an outer paper or similar covering so that the contact of the outer battery wall with the inner surface of the shell 20 will always be positive in any position.

The opposite end of the shell 20 is threaded to receive a globe holding socket 25. The socket is threaded near its outer end to complementally fit the threaded end of the shell 20, and is also suitably threaded at its inner end to receive the threaded shank of the light bulb 26.

When it is desired to use the lure without the bulb being lighted, the battery 23 is simply reversed as previously explained.

When it is desired to use the lure with the bulb 26 continuously lighted, then the lighting assembly is adjusted as shown in Figure 1 with the hub screwed down into its socket a sufficient distance to make contact with the terminal 24 and to thus hold the opposite end of the battery firmly against the similar end of the shell 20.

An important feature of our invention is the means for making the light flash on and off as the lure travels through the water. For this purpose we provide a suitable spacer band 27 which is inserted into the socket 25 before the bulb is inserted. The band 27 should snugly fit the shank of the bulb so that one of its ends will contact the glass portion and its opposite end will contact the bottom of the socket thus preventing the bulb from being screwed into the socket more than one or two turns. This arrangement leaves a space between the bulb terminal 28 and the battery terminal 24, and permits the battery a slight longitudinal movement within the shell. With the lighting assembly arranged thus the battery will move toward and away from the bulb terminal 28 as the lure is tilted up and down in the water due to its movement through the water. Naturally, when the battery terminal 24 and the light terminal 28 come in contact, the bulb 26 is lighted and the result is a lure which flashes either on the surface of the water, or beneath the surface of the water, and thus is much more efficient in actually attracting the fish.

If it is desired to use the lure entirely as a surface lure then it is only necessary to pivot the lure body to the position indicated by the dotted lines in Figure 2, remove the lure body 4 from the head 7, remove the entire lighting assembly from its seat in the head, and re-assemble the lure in the same manner, omitting the insertion of the lighting assembly. The fact that the lure body 4 is entirely sealed by the head 7 leaves a considerable volume of dead air space within the body which, of course, entirely prevents the lure from diving beneath the surface of the water.

We also wish to particularly point out that by using the swivel 17 in attaching the lure to the line it is not possible for a fish caught on either of the hooks to exert any twisting or side tension on the wire frame 11. With many of the lures being made and sold today the hook or hooks are attached to the rear end of the hollow body, and the twisting and turning of the fish results in the unscrewing of one part of the body from the other part, and in the consequent loss of the fish from the line. Our invention eliminates this difficulty.

If it is desired to use this lure as a flashing surface lure it is only necessary to increase the length of the body 4, thus also increasing the air space within the body sufficiently to entirely support the weight of the complete lure including the lighting assembly. The wire frame 11 would, of course, have to be increased in length accordingly.

We also call attention to the fact that by making the head of transparent or translucent material, the entire lighting assembly may be reversed, thus placing the light at the forward end of the lure instead of at the rear end, as shown.

While we have described and illustrated a specific embodiment of our invention, we are aware that numerous alterations and changes may be made therein without deviating from the inventive principle, and we do not wish to be limited except by the prior art and by the scope of the appended claims.

We claim:
1. In a fishing lure, the combination with a sealed hollow body, and an electrical lighting unit within the body, of: a wire cage extending longitudinally around said body, one end of the cage passing through one end of said body to form a pivotal connection; line attaching means formed integrally at one end of said wire cage; integral hook carrying means formed at intervals along said cage; and hooks carried by said last mentioned means.

2. An illuminated fishing lure comprising: a hollow body closed at one end; a stopper for sealing the opposite end of said body; an electrical lighting unit removably supported inside said body; and a substantially rectangular hook carrying wire cage, one of its ends pivotally extended through said stopper, and its opposite end adapted to contact the closed end of said hollow body for holding stopper and body together; and line attaching means at the forward end of said wire cage.

3. An illuminated fishing lure comprising a hollow body closed at one end; a stopper for sealing the opposite end of said body; an electrical lighting unit supported inside said body; and a substantially rectangular hook carrying wire cage, one of its ends being pivotally extended through said stopper; and its opposite end adapted to contact the closed end of said hollow body for holding the stopper and body together;

one end of the wire which forms said cage terminating in an eyelet or loop adjacent one end of the cage and adapted to slidably receive the other end of said wire; a stop on that end of said wire which slides in said eyelet for preventing the extreme end from passing through said eyelet; such slidable arrangement permitting a slight relative movement of the two ends of said cage; and line attaching means at the forward end of said wire cage.

4. An illuminated fishing lure comprising; a hollow body having one indented and closed end; a stopper for closing and sealing the opposite end of said body; an electric lighting unit housed by said body; a substantially rectangular one piece wire cage having one of its ends pivotally extended through the outer end of said stopper, and having its opposite end bent inward to form a tension fastener for seating in the indentation in the closed end of said hollow body; hooks carried by the wire cage; and line attaching means at one end of said wire cage.

5. In a fishing lure, the combination with a two part airtight hollow body, a wire cage pivotally connected to one end of said body and encompassing its opposite end; and hooks carried by the cage, of: an electrical lighting unit adapted to be carried inside said body and removable therefrom, comprising: an elongated hollow shell having at least one open and threaded end and being made of electrically conductive material; a bulb socket for the threaded end of said shell; a bulb for said socket; and a dry cell battery longitudinally slidable within said shell, its positive element substantially in axial alignment with the central contact element of said bulb, and its negative element adapted to contact said conductive shell to complete the electrical circuit through said bulb, said shell and battery being of such relative length as to permit longitudinal movement of said battery toward and away from the contact element of said bulb.

6. An electrical lighting unit for an intermittently flashing illuminated fishing lure, comprising: an electrically conductive elongated shell having one end open and threaded; a bulb socket adapted to fit the threaded open end of said shell; an electric light bulb for said socket; a dry cell battery witin said shell of such diameter as to be axially slidable therein, its negative element constituting substantially its entire outer surface and adapted to electrically contact said shell by force of gravity regardless of the position which the shell assumes, its positive element in substantial axial alignment with the central contact element of said bulb; and means co-operating with said bulb and its socket for limiting the penetration of the bulb into said shell and toward the positive element of said battery; whereby the battery is permitted a slight longitudinal movement between the inner end of said bulb and the opposite end of said shell, the electrical circuit to said bulb being closed only when said battery gravitates into actual contact with said bulb due to the tilted position of said shell.

7. In a fishing lure, the combination with a water tight substantially transparent housing, of a lighting unit for creating intermittent flashes of light within said housing comprisng: an electrically conductive elongated hollow shell mounted in said housing and having at least one open end; an electric light bulb mounted in the open end of said shell, one contact element of said bulb being electrically connected to said shell; and a dry cell battery axially slidable freely back and forth within said shell between the closed end thereof and the other contact of said bulb, the negative element of said battery constituting substantially its entire outer surface and adapted to make electrical contact with said shell by force of gravity regardless of the relative positions of the two, the positive element of said battery being in substantial axial alinement with and adapted to contact the central conact element of said bulb whenever the battery gravitates to the bulb end of said shell, thus completing the electrical circuit to said bulb.

8. An electrical lighting unit for an intermittently flashing fishing lure comprising: an electrically conductive elongated hollow shell having at least one open end; an electrically conductive bulb socket seated in the open end of said shell; a light bulb seated in said socket; and a dry cell battery within the shell, the length of said battery being less than the distance between the inner end of the seated bulb and the opposite end of said shell, whereby free axial gravitational movement is afforded the battery between the light bulb and the opposite end of said shell, the negative element of said battery adapted to electrically contact the inner wall surface of said shell by force of gravity regardless of the position of said shell, and its positive element adapted to contact the central contact element of said bulb only when the battery gravitates to the bulb end of said shell.

WILLIAM SEIGLE.
MAURICE SEIGLE.